(12) United States Patent
Scholz et al.

(10) Patent No.: US 6,461,707 B1
(45) Date of Patent: Oct. 8, 2002

(54) FACELESS PRESSURE-SENSITIVE ADHESIVE CONSTRUCTION

(75) Inventors: William F. Scholz, Altadena, CA (US); Eric Chen-nan Su, Mentor; Norman A. Conti, Painesville, both of OH (US); Frederick N. Miekka, Sierra Madre, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/269,115

(22) PCT Filed: Sep. 26, 1997

(86) PCT No.: PCT/US97/17404

§ 371 (c)(1),
(2), (4) Date: Mar. 19, 1999

(87) PCT Pub. No.: WO98/13810

PCT Pub. Date: Apr. 2, 1998

(51) Int. Cl.⁷ .............................. B32B 27/14; B32B 3/00
(52) U.S. Cl. ...................... 428/40.1; 428/195; 428/219; 428/220; 428/423.1; 428/474.4; 428/480; 428/914
(58) Field of Search ................... 428/40.1, 195, 428/219, 220, 423.1, 474.4, 480, 914

(56) References Cited

U.S. PATENT DOCUMENTS

| 2,708,650 A | | 5/1955 | Pullman et al. ............. 154/140 |
| 3,027,271 A | | 3/1962 | Plasse et al. .................. 117/76 |
| 3,038,597 A | * | 6/1962 | Brady, Jr. ...................... 206/56 |
| 3,183,198 A | | 5/1965 | Wagner ........................ 260/18 |
| 3,343,978 A | | 9/1967 | Engelbach .................... 117/76 |

(List continued on next page.)

FOREIGN PATENT DOCUMENTS

| GB | 1058074 | 2/1967 |
| GB | 299295 | 2/1996 |
| WO | WO9201555 | 2/1992 |
| WO | WO9311728 | 6/1993 |
| WO | WO9608539 | 3/1996 |
| WO | WO9712006 | 4/1997 |

OTHER PUBLICATIONS

Don E. Floyd, "Polyamide Adhesives," pp. 425–433.

C.R. Frihart et al., "Relationship of Dynamic Mechanical and Thermal Properties to Tack for Hot Melt Polyamide Films," *Hot Melt*, 1990, pp. 99–109.

Thomas Flanagan, "Hot–melt Adhesives," *Handbook of Adhesive Bonding*, pp. 8–1thru 8–30.

*Primary Examiner*—Bruce H. Hess
*Assistant Examiner*—B. Shewareged
(74) *Attorney, Agent, or Firm*—Christie, Parker & Hale, LLP

(57) ABSTRACT

Faceless PSA label constructions of this invention comprise a flexible substrate having a release surface, and a layer of pressure-sensitive adhesive disposed on the release surface. A nonblocking continuous film that, in combination with the pressure-sensitive adhesive is sufficiently self supporting, is disposed over a surface of the layer of pressure-sensitive adhesive to render the pressure-sensitive adhesive tack free. The continuous film is selected from the group of film-forming polymers consisting of polyamide resins, polyester resins, polyurethane resins, polyacrylate resins, vinyl acetate resins and mixtures thereof having a tensile strength of at least 200 psi, and a percent elongation of at least 50. The continuous film can be applied sequentially or simultaneously with the PSA. For purposes of simultaneous application it is desired that the continuous film be formed from a material having a hot melt viscosity that within a factor of about two times a hot melt viscosity for the PSA. The completed faceless PSA label construction is adapted to receive and retain printing or marking indicia directly onto a surface of the continuous film.

26 Claims, 6 Drawing Sheets

U.S. PATENT DOCUMENTS

| | | | |
|---|---|---|---|
| 3,471,357 A | 10/1969 | Bildusas | 161/165 |
| 3,623,944 A | 11/1971 | Davis | 161/242 |
| 3,843,480 A | 10/1974 | Dreher | 161/167 |
| 4,022,926 A | 5/1977 | Keough et al. | 428/41 |
| 4,135,033 A | 1/1979 | Lawton | 428/344 |
| 4,379,806 A | 4/1983 | Korpman | 428/354 |
| 4,391,853 A | 7/1983 | Pointon | 427/152 |
| 4,398,985 A | 8/1983 | Eagon | 156/233 |
| 4,716,052 A | 12/1987 | Waugh et al. | 427/147 |
| 4,853,421 A | 8/1989 | Hayes | 523/223 |
| 4,886,844 A | 12/1989 | Hayes | 523/223 |
| 4,917,926 A | 4/1990 | Weinhold et al. | 428/40 |
| 4,946,532 A | 8/1990 | Freeman | 156/243 |
| 5,025,043 A | 6/1991 | Smith | 523/326 |
| 5,095,058 A | 3/1992 | Smith et al. | 524/238 |
| 5,109,054 A | 4/1992 | Smith | 524/514 |
| 5,234,736 A | 8/1993 | Lee | 428/42 |
| 5,407,985 A | 4/1995 | Smith | 524/238 |
| 5,428,083 A | 6/1995 | Smith et al. | 523/414 |
| 5,539,025 A | 7/1996 | Smith et al. | 523/418 |
| 5,605,944 A | 2/1997 | Heebner | 523/404 |

\* cited by examiner

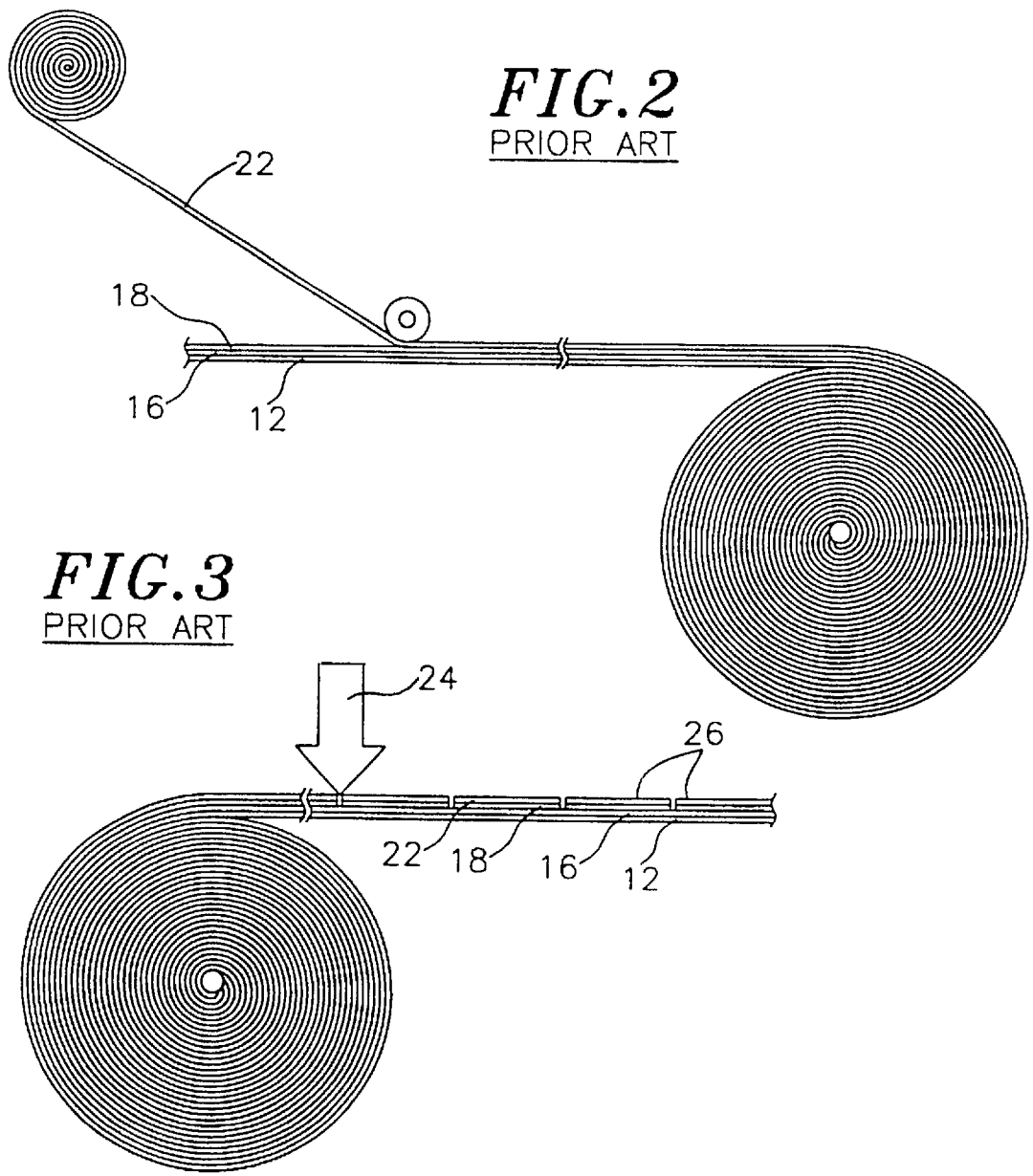

FACELESS PRESSURE-SENSITIVE ADHESIVE CONSTRUCTION

This application is claiming the benefit of provisional application No. 60/026,819 filed Sep. 27, 1996.

FIELD OF THE INVENTION

The present invention relates to pressure-sensitive adhesive constructions used for making tags, labels and the like and, more particularly, to pressure-sensitive adhesive constructions comprising a thin continuous film disposed onto a layer of a pressure-sensitive adhesive that renders an underlying pressure-sensitive adhesive layer surface tack free, and that is printable, convertible and dispensable.

BACKGROUND OF THE INVENTION

Pressure-sensitive adhesive (PSA) constructions such as labels, tapes, decals and the like are known in the art. For example, PSA label constructions are commonly used to apply a particular face stock having a specific nature of printing to an object or article, and are especially useful where objects having low surface energies are to be labeled. PSA label constructions typically comprise a liner, a PSA layer disposed onto the liner and a face stock laminated onto the PSA layer. The face stock is typically made from a web or sheet of paper, cardboard or plastic and is applied or laminated to the PSA layer sequentially at some time after the application of the PSA layer. The face stock is printed on with information or other indicia before or after it is laminated onto the PSA layer. The conventional PSA label construction is applied to an article surface or other substrate surface by removing the liner to expose the PSA layer and placing the PSA layer into contact with the desired surface, wherein the face stock remains attached to the opposite surface of the PSA layer.

In the manufacture and production of PSA constructions, a substantial amount of the overall cost involved is in the material costs for the face stock. be it paper, cardboard, or plastic. Additionally, where the tag or label is to be adhered to a contoured or irregular surface, and where a high degree of flexibility is desired. the rigidity of the face stock may interfere with the application and the adherence of the tag or label. Further, conventional PSA label constructions require sequential processing of the PSA layer and face stock, thereby lengthening the amount of time needed to manufacture a completed PSA label construction.

It is, therefore, desired that a PSA construction be constructed for use as a label, tag, tape, decal and the like that avoids the need to use a conventional face stock formed from paper, cardboard or plastic. It is desired that the PSA label construction have printability, convertibility and dispensability properties that are better than or equal to that of PSA label constructions having a conventional face stock. It is also desired that such PSA label construction be designed in a manner that reduces the amount of manufacturing time needed to complete the same, when compared to a PSA construction comprising a conventional face stock.

SUMMARY OF THE INVENTION

Faceless PSA label constructions of this invention are constructed without having a conventional face stock for printing indicia thereon but, rather comprise a thin, printable, convertible and dispensable continuous film disposed on an underlying PSA layer, that is preferentially removed with the PSA from a release liner to facilitate application onto a designated substrate. In an example embodiment, faceless PSA label constructions of this invention comprise a flexible substrate having a release surface, and a layer of pressure-sensitive material disposed on the release surface, and a continuous film is disposed over a surface of the layer of pressure-sensitive adhesive to render the pressure-sensitive adhesive tack free. The final film-forming layer is derived from a coatable or extrudable fluid with film-forming properties that is delivered to the pressure-sensitive adhesive layer in either 100 percent solids form, in an emulsion latex, or dissolved in a suitable solvent. Upon cooling or with removal of the water or solvent, a continuous, printable, self supporting film with measurable tensile, elongation, and tear properties is formed.

The continuous film is selected from the group of film-forming polymers consisting of polyamide resins, polyester resins, polyurethane resins, polyacrylate resins, vinyl acetate resins, and mixtures thereof. Because it is desired that the continuous film be self supporting, the continuous film has a tensile strength of at least 200 psi, and a percent ultimate elongation of at least 50. The continuous film can be applied sequentially or simultaneously with the pressure-sensitive adhesive. For purposes of simultaneous application it is desired that the continuous film be formed from a material having a hot melt viscosity that is within a factor to two times that of a hot melt viscosity for the PSA. The completed faceless PSA construction thus formed is capable of receiving and retaining printing and marking indicia directly onto the surface of the continuous film.

Faceless PSA constructions of this invention can be used as a label, tag, tape, decal and the like that avoids the need to use a conventional face stock formed from paper, cardboard or plastic. thereby eliminating application limitations regarding the same, e.g., now permitting application of label onto substrates having irregular surfaces. PSA constructions of this invention are self supporting and display printability, convertibility and dispensability properties that are better than or equal to that of PSA label constructions having a conventional face stock. PSA constructions of this invention also reduce manufacturing costs, avoiding the need to use a separate paper, cardboard, metallic or plastic face stock, and increase manufacturing efficiency by permitting simultaneous application of the continuous film layer and PSA, when compared to a PSA construction comprising a conventional face stock.

BRIEF DESCRIPTION OF THE DRAWINGS

These and other features and advantages of the present invention will become appreciated as the same becomes better understood with reference to the specification, claims and drawings wherein:

FIG. 2 is a semi-schematic side elevation of a method of applying a conventional face stock to the PSA label construction of FIG. 1 to form a laminated PSA label construction;

FIG. 3 is a semi-schematic side elevation of a method of converting the laminated PSA label construction of FIG. 2;

DETAILED DESCRIPTION OF THE INVENTION

The present invention is directed to thin, printable, convertible and dispensable PSA constructions which do not have a conventional face stock formed from paper, cardboard, or plastic laminated to a PSA layer. PSA constructions of this invention generally comprise a first flexible substrate, a layer of releasable material disposed on a surface of the flexible substrate, a PSA disposed on the layer of releasable material, and a thin layer of film-forming material (FFM) disposed onto a surface of the PSA layer that renders the PSA layer surface tack free, and that is adapted to be printed or otherwise marked upon. PSA constructions of this invention are referred to as being "faceless" because the FFM forms the substrate that is printed or marked upon, rather than using a conventional face stock that is subsequently laminated to the PSA layer. The design of a faceless PSA construction, avoiding the need to use such a conventional face stock, reduces the material costs for such PSA construction and reduces manufacturing time associated with producing the same.

Figure 1:
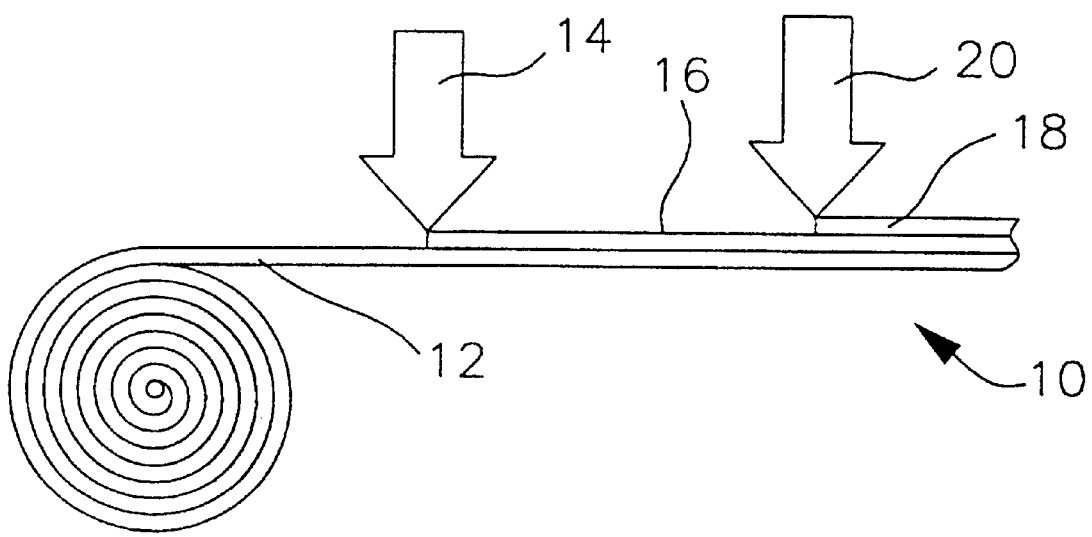
FIG. 1 is semi-schematic side elevation of a method of manufacturing a prelaminate PSA label construction.

FIG. 1 illustrates a conventional prelaminate PSA label construction 10 comprising a liner 12 having disposed thereon at station 14 a layer of releasable material 16, forming a release liner. A PSA layer 18 is disposed on the layer of the releasable material 16 at station 20. Referring to FIG. 2, a conventional face stock 22, in sheet stock or roll stock form made from paper, cardboard, plastic and the like, is disposed on a surface of the PSA layer 18 to form a completed conventional PSA label construction. Typically, the layer of releasible material 16 and PSA layer 18 are manufactured and laminated together with the face stock 22 during a single process, e.g., by a roll coating and lamination process or by a die coating and lamination process. As illustrated in FIG. 2, the face stock 22 is laminated to the PSA layer 18 sequentially, after the PSA layer is applied.

The completed or laminated PSA label construction is distributed to a converter where it is printed cut and stripped, e.g., by conventional die cutting and matrix stripping methods, to form the desired shape and size label. Thus for example, FIG. 3 illustrates the die cutting of the face stock 22 at a station 24 into a series of PSA labels 26 of desired shape and size, carried by the release liner 16.

For purposes of reducing material costs and manufacturing time, and increasing PSA construction application flexibility, PSA constructions of this invention are constructed without the use of a conventional face stock. Instead, PSA constructions of this invention comprise a layer of FFM in the form of a thin continuous film that is formed on and disposed over PSA layer and that is printable, convertible and dispensable, thereby eliminating the use of conventional face stock materials. Dispensing of the thicker label construction is achieved by the traditional peel-plate method, or the equivalent, and dispensing for the thin label construction is achieved by techniques described in U.S. Pat. Nos. 4,217,164 and 4,303,461, which are incorporated herein by reference.

Figure 4:
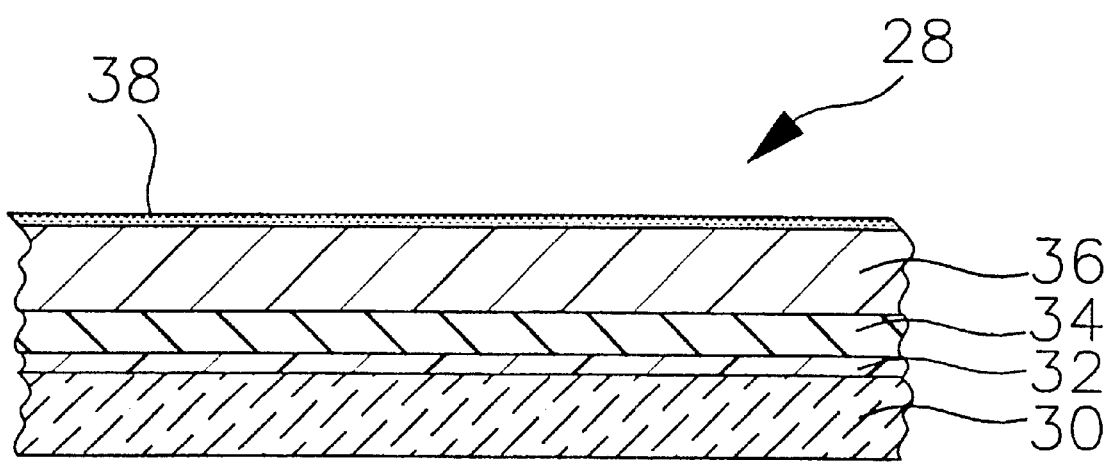
FIG. 4 is a cross-sectional side view of a faceless PSA label construction prepared according to principles of the invention.

With reference now to FIG. 4, an example embodiment of a faceless PSA label construction 28, prepared according to principles of this invention, includes a substrate 30 and a layer of releasable material 32 disposed on a surface of the substrate 30. It is to be understood that the substrate 30 may be in the form of any material suitable to act as a carrier for the construction. Preferred substrates include flexible materials that are selected from the group of stocks selected from sheet stock and roll or web stock. A particularly preferred substrate is a web stock in the form of a liner having a release material disposed thereon, thereby forming a release liner. A particularly preferred release liner is one that is commercially available from, for example, Rhinelander Paper of Rhinelander, Wis. under the product name Rhi-Liner 12, that has a thickness of about 65 micrometers and has a 42 pound per ream basis weight.

Suitable releasable materials 32 include those materials with a low surface free energy that have a low affinity for the PSA, thereby allowing the PSA to be peeled away without cohesive failure. Preferred releasable materials are selected from the group of silicone-containing materials. A particularly preferred silicone-containing material for forming the layer of releasable material is commercially available from, for example, General Electric Silicones of Waterford, N.Y. under the product name GE 6000.

A layer of PSA 34 is disposed on a layer of the releasable material 32, and a layer of FFM 36 is disposed on a surface of the PSA layer 34. The PSA layer 34 has a body portion and has a surface portion that is oriented immediately adjacent the layer of FFM 36. The FFM layer 36 renders the underlying PSA layer 34 tack free, thereby forming a nonblocking faceless PSA construction that enables subsequent handling or treatment of the construction without it adhering to itself or to any other adjacent surface. The tack-free surface is designed to accommodate printing indicia 38 directly thereon. The FFM 36 layer is in the form of a continuous film that completely covers the underlying PSA layer, and renders the faceless PSA construction completely nonblocking. Faceless PSA constructions of this invention are nonblocking up to a minimum temperature of at least 50° C., and in some instances up to about 70° C., for a 24 hour period under a pressure of about 40 kPa, as will be discussed in greater detail below.

It is important that faceless PSA constructions of this invention display such nonblocking characteristics to facilitate removing or separating the collected and/or stored faceless PSA construction from contiguous layers after it has been manufactured without causing the release liner to be pulled free of the PSA layer. The use of the releasable material on the release liner allows the release liner to be easily removable from the PSA layer to facilitate attachment of the completed, i.e., laminated, PSA construction to a desired article. Adhesive interference or blocking between the FFM and an adjacent backside surface of the release liner is not desired because it results in the release liner being pulled away from the PSA layer during the removal or separation operation, thereby rendering the faceless PSA construction useless.

It is desired that the FFM layer be formed from a material that is capable of being used with a variety of conventional PSAs, including silicone-based PSAs, rubber-based PSAs, and acrylic-based PSAs, without interfering with the desired performance characteristics of the PSA.

PSAs useful in forming faceless PSA constructions of this invention include those that are conventionally used in forming PSA constructions, such as rubber-based, silicone-based, and acrylic-based PSAs. Preferred adhesives systems are described in detail in U.S. patent application Ser. No. 07/755,585 filed Sep. 3, 1991, abandoned on Sep. 25, 1992, and incorporated herein by reference.

PSAs useful in forming faceless PSA constructions according to principles of this invention can include:

S-246—a hot melt rubber based PSA that is manufactured by the Fasson Division of Avery Dennison Corporation.

S-490—An acrylic emulsion PSA that is manufactured by the Chemicals Division of Avery Dennison Corporation.

The layer of PSA material can be applied to the substrate for example in the form of a hot melt, an emulsion or aqueous dispersion, as a solvent solution, or as a film membrane. The method that is used to apply the PSA material depends on the physical form of the PSA, and can include spray, roll, and die application methods. In preferred embodiments, the PSA material is applied in the form of a hot melt, solution, or emulsion by die application method. As will be discussed below, multi-die application methods can be used to simultaneously apply the PSA material along with the FFM.

The type of FFM that is selected may vary depending on the type of material that is used to form the PSA layer. For example, it may be desired that the FFM have a solubility parameter that is inconsistent or incompatible with that of the PSA to prevent migration between the two layers when applied simultaneously. Different methods can be used to apply the FFM to the surface of the PSA layer, depending on the type of FFM that is selected. Generally speaking, the methods described above for applying different forms of the PSA material can also be used to apply the same forms of the FFM. For example, FFMs in the form of aqueous dispersions can be applied by conventional coating methods such as roll coating, spray coating, die coating and the like, or by Meyer rod process; FFMs in the form of a solution or emulsion can be applied by die. spray, or roll process; and FFMs in the form of a hot melt can be applied by roll, spray or die process.

If desired, the application methodology used for the FFM can be independent of both the FFM chemistry and the particular method employed to apply the PSA layer. However, for purposes of manufacturing efficiency, it is generally desirable to use a FFM that is in the same form as the PSA material so that the same application methodology can be used for each. For example, when the PSA is in the form of a hot melt or a solution that is applied by die process, it may be desired that the FFM also be in the form of a hot melt or solution to facilitate its application by a die process, e.g., by multi-die process.

As discussed above, suitable techniques for applying the FFM onto the surface of the PSA layer include roll, spray Meyer rod, electrostatic, and die process depending on the particular form of the FFM as mentioned above. The application techniques generally fall into the category of either being a multi-step or sequential coating process, e.g., application of first the PSA layer and then the FFM, or a single-step or simultaneous process, e.g., application of the PSA and FFM together. In the multi-step process, the FFM can be applied to the surface of the PSA layer, after the PSA has been applied to the layer of releasable material on the release liner, in the form of a hot melt, aqueous dispersion, or solution by roll, spray, electrostatic, or die process. In the single-step process, die technology is preferably used to apply the FFM onto the PSA layer simultaneously with applying the PSA layer onto the layer of releasable material, in the form of a solution, emulsion or hot melt.

Figure 5:
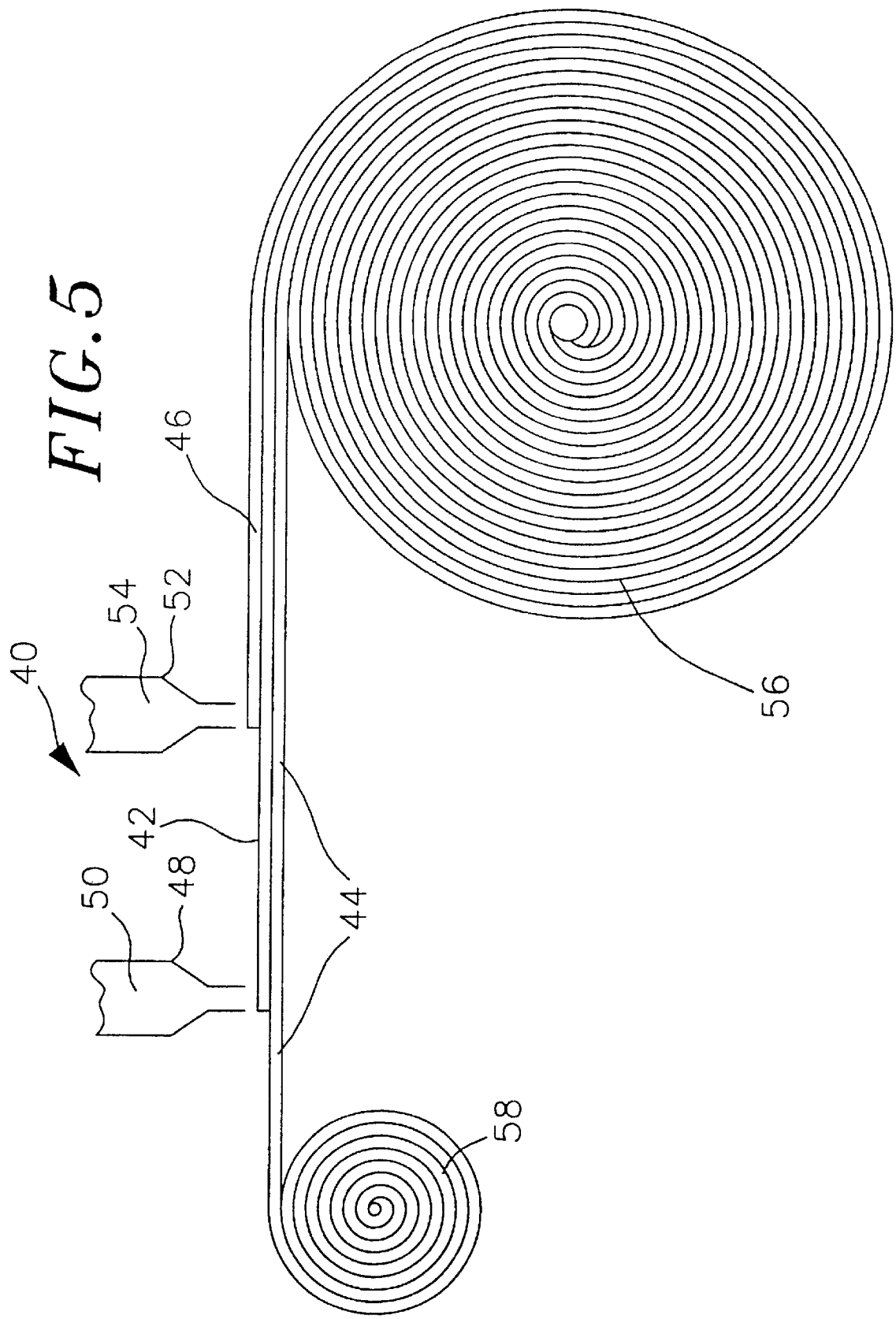
FIG. 5 is a semi-schematic side elevation of a first method making the faceless PSA label construction of FIG. 4.

FIG. 5 illustrates a first method of applying the PSA layer and FFM layer onto a substrate in the form of a web stock by a multi-step die or tandem die process 40, where the PSA layer 42 is applied to a release liner 44 in the form of a solution, emulsion or a hot melt, and the FFM layer 46 is subsequently applied to the PSA layer 42 as a solution, emulsion or a hot melt. This first method is illustrative of one that can easily be implemented using existing PSA coating equipment to permit subsequent application of the FFM. The PSA layer 42 is applied to the layer of releasable material on the release liner 44 by a PSA coating station 48, which contains a volume of PSA material 50. A FFM coating station 52 is disposed downstream from the PSA coating station 48 and comprises a volume of FFM 54 for depositing onto the PSA layer 42.

In the event that the PSA layer and FFM layer are each applied in the form of a hot melt, it may be desirable that a cooling platen (not shown) or the like be placed between the PSA coating station 48 and the FFM coating station 52, to cool the PSA layer 42 to prevent migration of the FFM therein. It may also be desirable to place a cooling platen (not shown) or the like after the FFM coating station 52 to cool the FFM 46 to ensure that it is tack free before the faceless PSA construction is wound on a collection roll 56.

In the event that both the PSA layer and FFM layer are applied in the form of absolution or emulsion, it may be desirable to place an evaporator (not shown) or the like between the PSA coating station 48 and the FFM coating station 52, to drive the solution out of the PSA layer to prevent bubble formation after application of the FFM layer. It may also be desirable to place an evaporator (not shown) or the like after the FFM coating station 52 to drive the evaporatable species out of the FFM layer 46 before the faceless PSA construction is wound on the collection roll 56.

As a continuous roll of the release liner 44 is unwound or dispersed from a pay out roll 58, the PSA coating station 48 deposits a predetermined thickness of PSA material 50 onto the layer of releasable material on the release liner 44, forming a PSA layer 42 thereon. The FFM coating station 52 deposits a predetermined thickness of the FFM 54 onto the surface of the PSA layer 42, as the faceless PSA construction travels in a continuous web through the FFM coating station 52, forming a FFM layer 46 thereon.

In an example embodiment, the PSA layer 42 has a coat weight in the range of from about 5 to 125 grams/square meter ($g/m^2$), or has a thickness in the range of from about 5 to 125 micrometers assuming a PSA density of about one. It is desired that the FFM layer 46 have a coat weight in the range of from about 0.5 to 100 $g/m^2$ (0.5 to 100 micrometers thickness assuming a density of about 1), where a preferred FFM layer coat weight is in the range of from about 1 to 50 $g/m^2$ (1 to 50 micrometers thickness), and where a most preferred FFM layer coat weight is in the range of from about 4 to 35 $g/m^2$ (4 to 35 micrometers thickness).

It is to be understood that the coat weight and layer thickness of both the PSA and FFM may vary depending on the particular faceless PSA construction application. A FFM having a coat weight and/or thickness in the desired range provides a desired degree of protection against adhesion between the PSA layer and an adjacent backside surface of a release liner when in the stored position, to permit storage and transporting of the collected faceless PSA construction for further processing, e.g., printing, conversion or the like.

A key feature of faceless PSA constructions of this invention is the ability of the thin FFM layer to provide the structural properties necessary to facilitate conversion and dispensing without the use of a conventional face stock. A FFM having a coat weight and/or thickness in the desired range provides a faceless PSA construction that is, in combination with the pressure-sensitive adhesive layer. sufficiently self supporting to facilitate conversion and dispensing.

If desired, the coat weight and/or thickness of either the FFM or PSA layer can be metered by use of a Meyer rod that can be placed after each respective coating station. To ensure accurate monitoring of the thickness of the FFM, ultraviolet (UV) chromophores can be added to the FFM to allow visual observation of coating quality during the application process, and to allow monitoring of the coat weight by on-line use of a combination ultraviolet and radio frequency gauge. A particularly preferred UV chromophore is Leucopure EGM available from Clariant Chemicals.

After the faceless PSA construction has passed the FFM coating station 52 and the FFM 54 has been applied, the faceless PSA construction is routed to and is collected on the collection roll 56. When a desired quantity of the faceless PSA construction has been manufactured, the collection roll 56 is removed from the process and is stored for subsequent processing, e.g., printing, and/or conversion, during a separate operation at either the same or at a different geographic location, thereby providing enhanced manufacturing flexibility. Alternatively, rather than being collected, the completed faceless PSA construction can be routed for printing or other marking process and/or conversion during the same manufacturing operation.

Figure 6:
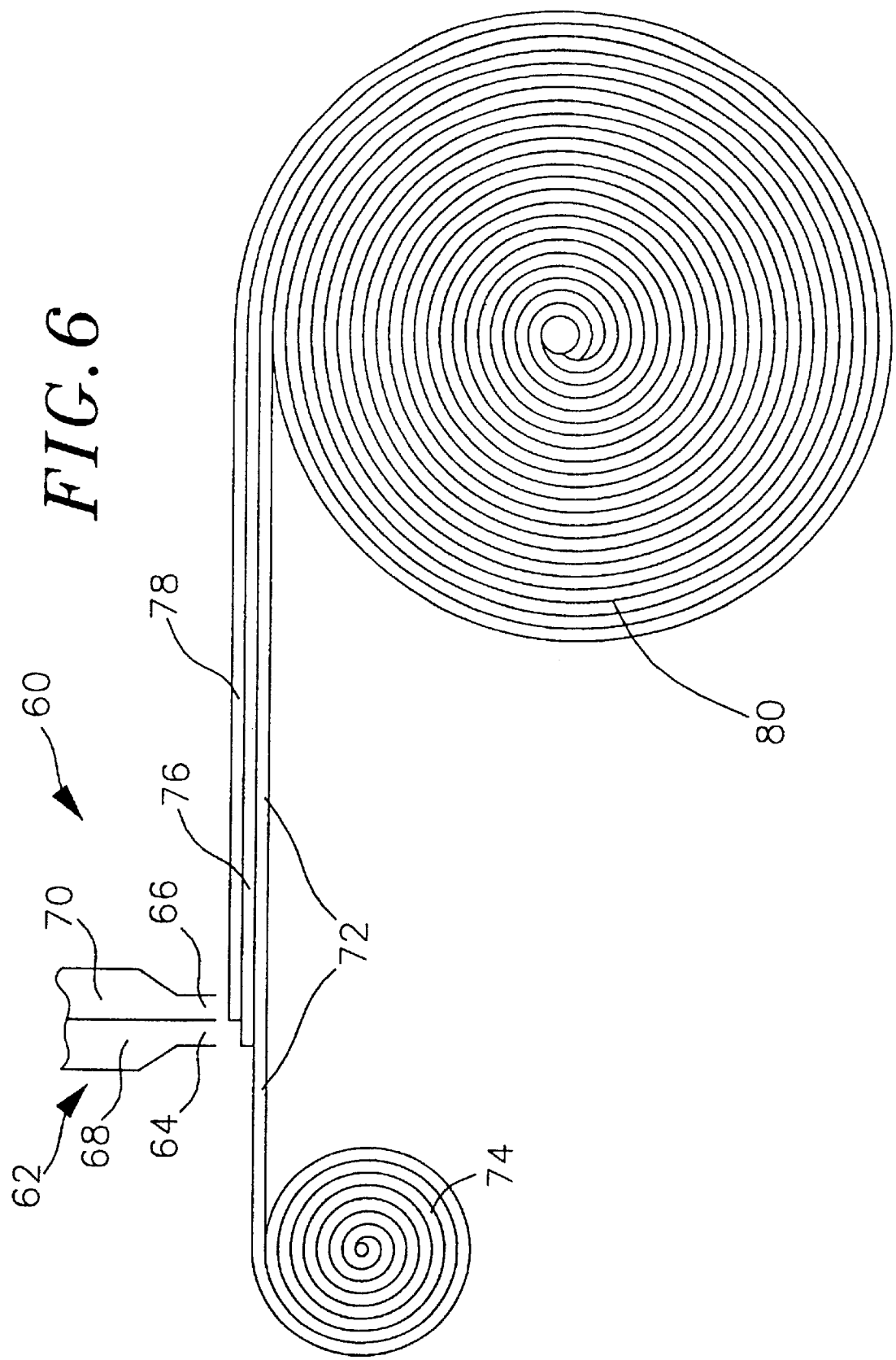
FIG. 6 is a semi-schematic side elevation of a second method of making the faceless PSA label construction of FIG. 4.

A second method of applying the PSA layer and FFM by a single-step multi-die process 60 is illustrated in FIG. 6. A dual die station 62, comprising a PSA die chamber 64 and a FFM die chamber 66, comprises a quantity of PSA 68 and FFM 70 in respective separated compartments. The dual die station 62 is used to deposit both the PSA and the FFM, in the form of either a hot melt, solution or emulsion, simultaneously in one step.

Although FIG. 6 illustrates a single-step multi-die process comprising a dual die station for applying the PSA layer and FFM layer, it is to be understood that the multi-die process may comprise a die station having more than two die compartments, depending on the number of layers to be deposited onto the release liner. Multi-die application methods useful for applying both the PSA layer and the FFM layer are further described in Published PCT International Application Nos. PCT/US95/11807; PCT/US95/11733; PCT/US95/11734; and PCT/US95/11717, which are herein incorporated by reference.

As a continuous roll of the release liner 72 is unwound from a pay out roll 74, the PSA die chamber 64 deposits a thickness of the PSA material 68 onto the layer of releasable material on the release liner 72, forming a PSA layer 76 thereon. At the same time that the PSA material is being deposited, a thickness of the FFM 70 is deposited by the FFM die chamber 66 onto the just-formed surface of the PSA layer 76, forming a FFM layer 78 thereon. The completed faceless PSA construction is either routed for subsequent printing and/or conversion, or is collected on a collection roll 80.

As discussed above, subsequent printing and conversion of the faceless PSA construction may occur at the same geographical location where the faceless PSA construction is manufactured, or may occur at a different geographical location. Alternatively, rather than being collected, the completed faceless PSA construction can be routed for printing and/or conversion during the same manufacturing operation.

In the event that the PSA layer and FFM layer are applied as a hot melt, a cooling platen (not shown) or the like can be placed between the dual die station 62 and the collection roll 80 to reduce the temperature of the FFM layer 78 to ensure that it is tack free before being collected on the collection roll 80, thereby avoiding unwanted sticking to the adjacent backside surface of the release liner.

In the event that the PSA layer and FFM layer are applied as a solution or emulsion, an evaporator (not shown) or the like can be placed between the dual die station 62 and the collection roll 80 to drive off the evaporatable species from the faceless PSA construction before being collected on the collection roll 80 to avoid unwanted sticking to the adjacent backside surface of the release liner.

After the FFM layer has been deposited onto the underlying PSA layer, the faceless PSA construction, it may be desirable to further heat the FFM layer to ensure that any streaks, surface imperfections or other voids that may have been formed therein and that expose the underlaying PSA layer are removed so that the FFM layer forms an imperforate continuous film covering the PSA layer before being collected. Such further heat treating step is helpful when the FFM has a high solids content either during or after its application. A FFM applied as a hot melt, by either multistep or tandem die process, has a solids content of approximately 100 percent. Streaks or other surface imperfections that expose the underlaying PSA layer may be formed in the FFM during its application by particulate matter in the die. Because of its high solids content, the FFM is unable to readily migrate or flow after it is applied to fill in such streaks or imperfections in the FFM layer. If left untreated, the exposed PSA layer will be allowed to make contact with a backside surface of the release liner when the faceless PSA construction is collected on the collection roll.

Contact between the PSA layer and the contiguous release layer backside surface will cause the faceless PSA construction to adhere to such backside surface, thereby making the faceless PSA construction difficult to unwind and causing the PSA layer to bond permanently to the release layer backside surface. Once the PSA layer is pulled away from its underlaying release layer and is transferred to the backside surface of the contiguous release layer the PSA faceless construction is ruined and is unsuited for lamination.

A FFM that is applied as a solution or as an emulsion, by either multi-step or tandem die process, will have a solids content of approximately 100 percent after the solvent or emulsifying agent has been evaporated away. Like the hot melt applied FFM layer, the die process that is used to apply a solvent or emulsion FFM may also create streaks or other imperfections in the FFM that exposes the underlaying PSA layer. Streaks or imperfections in the FFM may be formed in solution or emulsion applied FFMs when either the FFM does not adequately wet the underlying PSA layer, or when the FFM becomes dewetted with the underlying PSA layer during further processing, e.g. during evaporation. If left untreated, the streaks or imperfections could cause a catastrophic failure of the faceless PSA construction as discussed above during the unwinding process by PSA layer transferal.

Streaking or the formation of other imperfections in the FFM, that expose the underlaying PSA layer, are eliminated by heat treating the faceless PSA construction at a stage after application of the FFM layer but before the faceless PSA construction is collected on a collection roll. Heat treating the FFM layer at this point causes the FFM to soften, reflow and migrate to fill in any streaks or imperfections.

Figure 7:
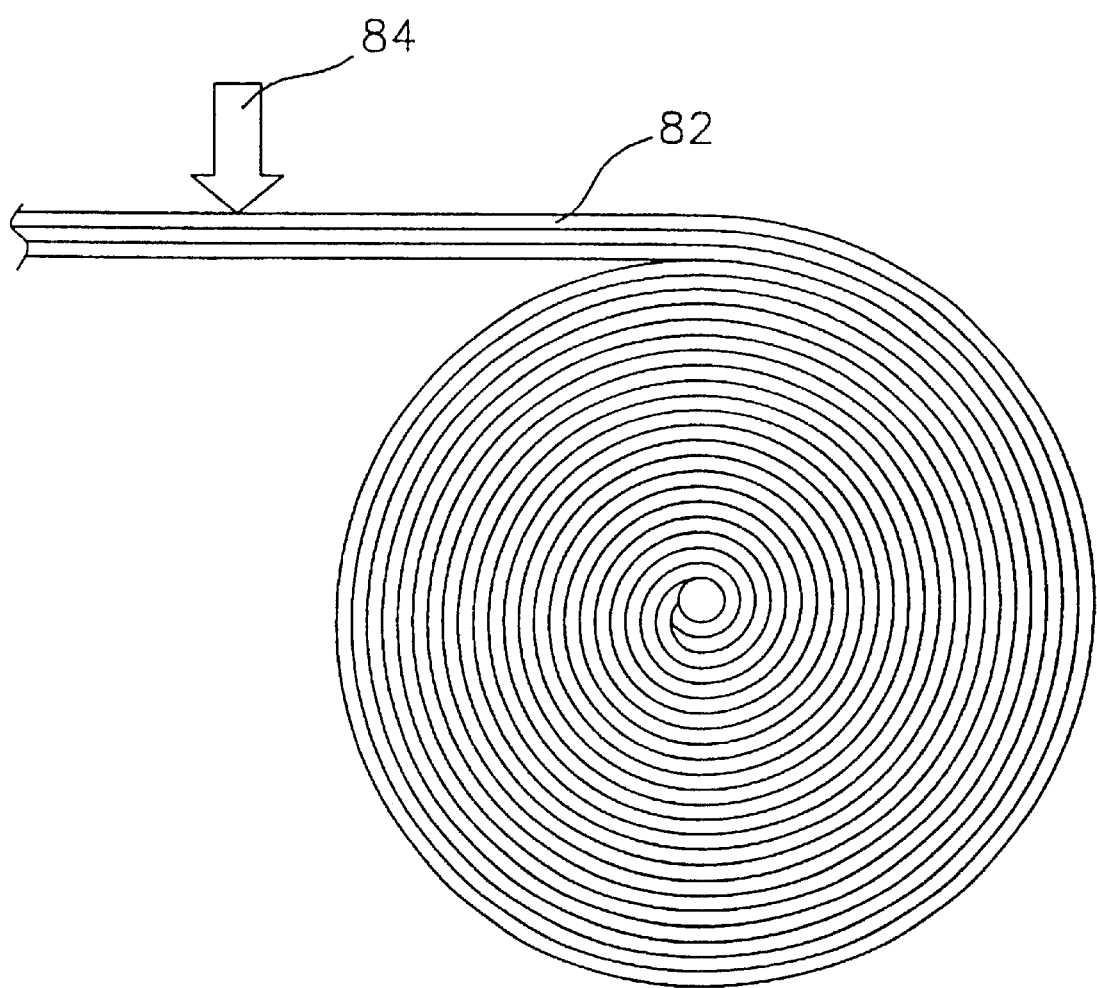
FIG. 7 is a semi-schematic side elevation of a method for heat treating a continuous film material layer of faceless PSA label constructions of this invention.

Referring to FIG. 7, where the FFM layer 82 is applied as a hot melt, it is preferably heat treated by exposure to a radiation, convention or conduction heating means as indicated generally by arrow 84 to a flow temperature that is below the FFM liquification temperature but sufficiently high to cause the FFM to reflow and fill any streaks or imperfections. In an example embodiment, the FFM layer is heated to a temperature of approximately 150° C. (300° F.) to cause it to flow a sufficient amount to fill all streaks or imperfections that expose the underlying PSA, and thereby produce a FFM layer in the form of an imperforate continuous film that completely covers the underlaying PSA layer.

Referring still to FIG. 7, where the FFM layer 82 is applied in the form of a solvent or emulsion, the FFM layer is heat treated by exposure to radiation, convention or conduction heating as indicated by arrow 84. Heat treating the FFM layer 82 can take place independently from the evaporation operation, and can be effected by a heating means that is independent of that used for the evaporating operation. Alternatively, the step of heat treating the FFM layer 82 can be carried out as part of the evaporation operation by further heating the FFM after evaporation to a flow temperature that is below the FFM liquification temperature but sufficiently high to cause the FFM to flow and fill any streaks or imperfections. In an example embodiment, the FFM layer is heated to a temperature of approximately 150° C. (300° F.) after being evaporated to cause it to flow a sufficient amount to fill all streaks or imperfections that expose the underlying PSA, and thereby produce a FFM layer in the form of an imperforate continuous film the completely covers the underlaying PSA layer.

In a preferred embodiment, where streaks or other imperfections are discovered to be present in the FFM layer, the FFM is heat treated in three continuous zones using forced air convection ovens. The first zone was heated to 100° C., the second to 120° C., and the third to 140° C. Each oven was approximately eight feet in length. The coated laminate traveled at a speed of approximately 50 feet per minute, giving a residence time of approximately 9.6 seconds through each zone.

Samples of faceless PSA constructions prepared according to the conditions discussed below were tested to determine the surface roughness of the FFM layer before and after being heat treated in the manner discussed immediately above. The FFM layer of a non-heat treated faceless PSA construction had an average surface roughness of approximately 0.87 micrometers, and a RMS surface roughness of approximately 1.08, when measured using a Wyco surface morphology microscope scanned at a magnification of approximately 5.3 times, using a scan area of approximately 1170×880 micrometers, and using a point-to-point distance of approximately 3.10 micrometers. The FFM layer of a heat treated faceless PSA construction had an average surface roughness of approximately 0.58 micrometers, and a RMS surface roughness of approximately 0.71 micrometers under the same measurement conditions. Based on these results, the process of heat treating the FFM layer as described herein reduced the surface roughness of the FFM layer by approximately 40 percent, thereby evidencing the filling and minimization of streaks and other imperfections in the FFM layer. Additionally, the heat treated FFM layer also displayed a surface finish that was glossier than that of the non-heat treated faceless PSA construction.

A key feature of faceless PSA constructions of this invention is that they do not rely on the use of conventional face stocks for purposes of proving a substrate for accommodating printing and marking indicia. This permits PSA construction to be manufactured at a lower material cost than convention PSA constructions comprising such conventional face stocks. Faceless PSA constructions of this invention also promote manufacturing efficiency by both enabling the FFM to be applied with readily available coating machinery, thereby eliminating the need for subsequent laminating machinery, and by enabling simultaneous application of the FFM and PSA, thereby avoiding the need for sequentially applying the face stock. Faceless PSA constructions of this invention also promote application flexibility, enabling use of the PSA construction in applications where the construction adherend has a contoured or irregular shape and a high degree of flexibility is required.

While particular methods for manufacturing faceless PSA constructions have been described and illustrated, it is to be understood that conventional methods for applying PSA materials, and for making PSA constructions, can also be adapted to manufacture faceless PSA constructions of this invention.

Suitable FFMs useful for forming faceless PSA constructions of this invention include materials that are: (1) coatable or extrudable; (2) continuous film formers; (3) capable of completely and uniformly covering the underlying PSA layer; and (4) that are, in combination with the PSA, sufficiently self supporting to facilitate printing, conversion, and dispensing. A key feature of FFMs useful for forming faceless PSA constructions is that they cure, dry or cool to both form a completely nonblocking layer and, in combination with the PSA, are sufficiently self supporting, having properties of tensile strength, elongation and tear. Example FFMs include thermoplastic polymers selected from the group including, but not limited to, polyamide resins, polyester resins, polyurethane resins, polyacrylate resins, vinyl acetate resins, and mixtures thereof.

When the FFM used to form faceless PSA construction is applied in the form of a hot melt, solution. or emulsion by dual die method, it is desired that the FFM have a hot melt, solution, or emulsion viscosity during the coating operation that is within a viscosity window similar to that of the PSA material. This is desired to enable the FFM to form a continuous film that completely and uniformly covers the underlying PSA layer, thereby forming a nonblocking faceless PSA construction. The simultaneous delivery of the PSA and FFM is possible using conventional coating equipment and a multi-die or an extruder if the viscosities between the respective materials are relatively close and the two materials do not significantly interact with each other. When applied simultaneously using conventional die methods it is desired that the PSA and FFM have a hot melt viscosity and melting temperature that are relatively similar. The use of polyamide resins in particular are suitable FFMs for conventional hot melt adhesives because their viscosities are similar in magnitude at the application temperatures used to deliver the respective materials.

For example, when the PSA is a conventional hot melt adhesive, the melting temperatures of the PSA are in the range of from about 150° C. to about 200° C., and preferably in the range of from about 165° C. to about 180° C. It is, therefore, desired that the FFM selected for use with such PSA have a melt temperature below about 200° C., and preferably in the range of from about 150° C. to 180° C.

Conventional hot melt PSAs have a Brookfield viscosity in the range of from about 25,000 to 90,000 centipoise at 175° C. It is desirable that the FFM that is used with such PSA have a viscosity that is within a factor of two times that of the PSA. A FFM having a hot melt, solution, or emulsion viscosity more than about two times below that of the PSA material can produce a FFM layer having film defects that prevent complete and uniform PSA layer coverage. A FFM having a hot melt, solution, or emulsion viscosity of more that about two times higher than the PSA material can produce a FFM layer that also displays film defects, thereby preventing complete and uniform PSA layer coverage. Preferred FFMs have a hot melt, solution, or emulsion viscosity window during coating by dual die process that is within a factor of about two times the viscosity of the just-applied PSA material.

It is desired that the FFM selected also have a chemistry that is not compatible with the underlying PSA material to prevent its migration into the PSA layer when deposited onto the PSA layer. Migration of the FFM into the PSA layer is not desired because it: (1) impairs the ability of the FFM to form a completely nonblocking layer; (2) interferes with the adhesive properties of the PSA layer; and (3) reduces the ability of the FFM layer to serve as a substrate for receiving and retaining printing and marking indicia.

It is desired that the FFM layer have a tensile strength of at least 200 psi, and more preferably in the range of from 200 to 2,000 psi. A FFM having a tensile strength less than about 200 psi can produce a faceless PSA construction that is difficult to convert by die cut and matrix strip methods at cost effective web speeds, e.g., at web speeds greater than about 50 feet per minute. A FFM layer having a tensile strength greater than about 2,000 psi can produce a faceless PSA construction that is difficult to die cut and matrix strip, depending on the particular type of PSA and FFM, and on the particular coat weights of the same.

It is desired that the FFM layer have a percent ultimate elongation of at least 50, and more preferably in the range of from about 50 to 500. A FFM having a percent ultimate elongation less than about 50 can produce a faceless PSA construction that is difficult to convert due to tearing and the like. A FFM layer having a percent ultimate elongation greater than about 500 can produce a faceless PSA construction that is difficult to convert by die cutting and matrix stripping, depending on the type of PSA and FFM, and on their respective coat weights.

Preferred film-forming resins useful for forming the FFM layer are thermoplastic polyamide resins. Particularly preferred polyamide resins are those commercially available, for example, from Union Camp of Wayne, N.J. under the Uni-Rez product line. Dimer-based polyamide resins available from Bostik, Emery, Fuller, Henkel (under the Versamid product line) to name a few can also be used. Other suitable polyamides include those produced by condensing dimerized vegetable acids with hexamethylenediamine. Referring to the Union Camp materials, the particular Uni-Rez polyamide resin or resin blend that is selected ultimately depends on the particular faceless PSA construction physical properties desired, and may depend on the type and viscosity of the PSA material used to form the underlying PSA layer.

In an exemplary embodiment, where the underlying PSA material is S-246, a preferred FFM formed from the polyamide resin comprises a blend of Uni-Rez resins that both provides a desired viscosity within the range described above, and produces a self-supporting surface having desired properties of tensile strength, elongation and peel. For example, a 1:3 mixture of the Uni-Rez 2620 and 2623 polyamide resins produces a blend having a Goettfert viscosity curve at 155° C. within a shear rate range of from 0 to 40,000 seconds$^{-1}$, that is within a factor of about two times the Goettfert viscosity curve at 155° C. for the S-246 PSA material.

Physical properties of FFM layers formed from the Uni-Rez product line, such as viscosity. tensile strength (ASTM D1708), percent ultimate elongation (ASTM D1708), and peel (ASTM D1876), are set forth in Table 1 below.

TABLE 1

| FFM Type (Uni-Rez product code) | Softening Point (° C.) | Brookfield Viscosity (cPs at 190° C.) | Tensile Strength (Psi) | Percent Ultimate Elongation | Peel (pli) |
| --- | --- | --- | --- | --- | --- |
| 2620 | 105 | 900 | 1,000 | 50 | 0 |
| 2623 | 136 | 6,500 | 1,000 | 400 | 0 |
| 2665 | 165 | 11,000 | 2,000 | 500 | 0 |
| 2695 | 128 | 5,000 | 200 | 175 | 30 |
| 2620 & 2623 (blend at 1:3) | 128 | 5,100 | 1,000 | 313 | 0 |

After the FFM layer is deposited on the faceless PSA construction the completed construction can either be collected for future printing and converting at a different time and/or geographic location, or can be routed to another station for printing and/or converting during the same operation. In an example process, the completed faceless PSA construction is collected for future printing and conversion. Before printing it is desired that the faceless PSA construction be treated to make the surface of the FFM layer more receptive to subsequent printing or marking. In an example embodiment, the faceless PSA construction is treated by conventional surface treatment method, such as corona treatment and the like, to increase the surface energy of the FFM layer to facilitate wetting during the printing process.

After the faceless PSA construction is surface treated it is passed to one or more printing stations where the treated FFM layer surface is printed upon by conventional method, such as by Gravure method, Flexo method, and the like. The FFM layer surface can be printed upon using conventional water-based, solvent-base, and ultra-violet inks, to provide a desired design and/or message. In an example embodiment, the FFM layer is printed upon via one or more printing station by Flexo method applying ultra-violet ink via Anilox rolls. The total thickness of the print layer is understood to vary depending on the number of printing stations and thickness of ink applied at each station to create a particular design or message. In an example embodiment, the total print thickness is approximately 10 micrometers, applied via multiple printing stations and multiple Anilox rolls. Ultra-violet ink is designed to cure to form a cross linked structure that provides supplemental reinforcement to the underlying FFM layer, thereby aiding subsequent convertibility and dispensability.

After the faceless PSA label construction is printed or marked it is routed for converting, where it can be converted by conventional conversion methods, such as by die cutting and matrix stripping. In an example embodiment, the faceless PSA label construction is converted by die cutting and matrix stripping methods at a web speed that is comparable to PSA label constructions comprising conventional face stocks. In an example embodiment, the faceless PSA construction is die cut and matrix stripped at a web speed of approximately 150 feet per minute, and can be die cut and matrix stripped at web speeds up to approximately 300 feet per minute depending on a number of factors, such as the type of FFM used, the coat weight of the FFM, the thickness and type of ink used to print or mark the FFM layer. Generally speaking, faceless PSA constructions comprising higher coat weights of the FFM layer permit conversion at greater speeds than those comprising lower coat weights of the FFM layer.

An example illustrative of faceless PSA label constructions of this invention is as follows:

EXAMPLE
Faceless PSA Construction

A faceless PSA construction was prepared by hot melt dual die method by applying a PSA layer comprising S-246 adhesive to a 42 pound basis weight per ream Rhi-Liner 12 release liner comprising a layer of General Electric 6000 silicone releasable material. A FFM comprising a blend of Uni-Rez 2620 and 2623 polyamide resin (having a hot melt viscosity similar to that of the PSA) was simultaneously applied to a surface of the PSA layer. The coat weight of the PSA adhesive was about 20 g/m$^2$, or about 20 micrometers thick. Five grams of Leucopure EGM UV chromophore was added to about five gallons of the polyamide blend at a blend ratio of one gram Leucopure per gallon resin to permit visual observation of the FFM layer under a UV light. The polyamide resin blend comprised about 25 percent by weight 2620 and 75 percent by weight 2623. The polyamide resin was applied at a coat weight of about 25 g/m$^2$, or about 25 micrometers thick.

Samples of the faceless PSA construction prepared in the example were tested for tensile strength at a web speed comparable to that used during a die cutting and matrix stripping conversion process, as measured crosswise across the width of the web (cross direction). The FFM layer of the faceless PSA construction was found to have a tensile strength of approximately 1,000 psi.

The faceless PSA construction was printed upon by Flexo method using three printing stations and three Anilox rolls. An ultra-violet ink was used and the total ink coating thickness was approximately 10 micrometers. The printed faceless PSA label construction was next converted by die cutting and matrix stripping. A 7.5 inch (190 mm) wide web was die cut and printed two across. The label size measured 3.25 inch (82 mm) across (cross direction), 4.5 inch (114 mm) long (machine direction), 0.25 inch (6 mm) center matrix between labels, and 0.43 inch (11 mm) matrix on outside edges. The labels had a 0.18 inch (4 mm) radius, 0.125 inch (3 mm) cross direction matrix at the narrowest point, and tapered wider to 0.31 inch (8 mm) at ends to aid in matrix stripping. The conversion process took place at a web speed of approximately 160 feet per minute.

The ability of the FFM layer to form, in combination with the PSA, a sufficiently self-supporting surface is important because it permits the faceless PSA construction to be converted, for example by die cutting and matrix stripping methods as discussed above, without a conventional face stock material laminated thereto at high web speeds without matrix breaking and the like. This feature allows the faceless PSA construction to be converted at speeds equal or greater than that of PSA constructions comprising a conventional face stock, while both reducing raw material costs and increasing application flexibility. Additionally, the use of such a FFM layer forming a sufficiently self-supporting construction permits the converted product to be subsequent dispensed by conventional dispensing methods.

A key feature of faceless PSA constructions prepared according to principles of this invention is that they display excellent nonblocking properties, thereby allowing the construction to be placed against a contiguous backside surface of the release liner, or any other object surface, without adhesive interference therewith. Faceless PSA constructions of this invention have been tested to determine minimum nonblocking parameters. An example of the block testing that was conducted is as follows:

Block Testing—Faceless PSA Construction

A polyamide resin FFM was prepared by reacting equimolar quantities of 1,6-hexanediamine with Hystrene 3695 dimer acid from Humco. The resulting mixture was dissolved at about 20 percent solids into the following solvent mixture; 25 percent by weight of 2-propanol, 25 percent by weight of 1-pentanol, and 50 percent by weight of 2-butanol.

A 42 pound bias weight Rhi-Liner SCK stock from Rhinelander was coated with G.E. 6000 silicone release formulation to a coat weight of about 1 g/m$^2$, forming a first release liner. A hot melt PSA was coated onto the surface of the first release liner at a coat weight of about 20 g/m$^2$ and a second release liner of very low release force was laminate to the exposed PSA to form a construction consisting of PSA between the two release liners. The construction was placed on an unwind of a pilot coater, the laminate was unwound, and the second release liner was removed to expose the active PSA surface.

The polyamide solution prepared above was coated directly onto the exposed PSA surface by direct application from a smooth steel roll in a pan fed nip. The faceless PSA construction was dried in air floatation ovens having three zones set for about 82° C. The resultant coating was uniform and tack free, producing a completely nonblocking faceless PSA construction. The dried coat weight of the polyamide FFM was measured to be about four g/m$^2$.

Samples from the above-described faceless PSA construction consisted of four 50 millimeter by 200 millimeter strips. The strips were block tested on a gradient temperature hot plate operated in the range of from about 26° C. to about 115° C. A first strip was placed on the hot plate with the FFM layer positioned adjacent the hot plate surface and a backside surface of the first release liner directed up. A second strip was placed on top of the first strip with its FFM layer positioned against the backside surface of the release liner from the first strip, i.e., with second strip's FFM layer facing upwardly. The strips were oriented on the gradient hot plate in their machine direction between a temperature gradient of from about 35° C. to about 85° C.

A weight of about 22 kilograms was placed on a sufficient area the FFM layer of the second strip to impose a pressure of about 40 kPa on the combined first and second strip faceless PSA constructions. After about 24 hours at the about 40 kPa, the samples were removed and observed for blocking. Blocking, for purposes of this test, is defined as the point at which the adhesive of the second strip transfers from the release liner of the second strip. Blocking, at a hand delamination peel rate of about 25 millimeters/sec, was observed to occur between the two strips at a temperature of about 70° C. The force needed to peel the adhesive from the release liner was in the range of from about 0.8 to 1.2 grams/millimeter.

The result of such experiment demonstrates that faceless PSA constructions of this invention are nonblocking to a minimum temperature of at least 50° C., and in some instances to about 70° C. for 24 hours at a pressure of about 40 kPa.

If desired, faceless PSA constructions of this invention may comprise a FFM that has been treated to provide a particular desired effect. For example, the FFM can be tinted to provide a colored printable surface, or can be treated to provide an opaque or non-transparent printable surface. If such effect is desired the FFM can be modified with agents well known in the art to produce the same.

Although limited embodiments of faceless PSA constructions and methods for making the same according to principles this invention have been described herein, many modifications and variations will be apparent to those skilled in the art. Accordingly, it is to be understood that, within the scope of the appended claims, faceless PSA constructions of this invention may be prepared other than as specifically described herein.

What is claimed is:

1. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the printable continuous film has a tensile strength of at least 200 psi.

2. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the printable continuous film has a percent elongation of at least 50.

3. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the non-preformed film is selected from the group of film-forming polymers consisting of polyamide resins, polyester resins, polyurethane resins, polyacrylate resins, vinyl acetate resins, and mixtures of any of the foregoing resins.

4. The pressure-sensitive adhesive construction as recited in claim 3 wherein the printable continuous film is formed from a polyamide resin, has a tensile strength in the range of from about 200 to 2,000 psi, and has a percent elongation in the range of from about 50 to 500.

5. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the non-preformed film has a hot melt viscosity that is within a factor of about two times a hot melt viscosity of the pressure-sensitive adhesive.

6. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the non-preformed film has a coat weight in the range of from 4 to 35 $g/m^2$.

7. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction; and wherein the printable continuous film provides a nonblocking surface having a minimum blocking temperature of at least 50° C. for a period of 24 hours at a pressure of about 40 kilopascals.

8. An imprintable pressure-sensitive adhesive construction comprising:

a flexible substrate having a release surface;

a layer of pressure-sensitive adhesive disposed on the release surface;

a printable continuous film layer disposed on the layer of pressure-sensitive adhesive that is formed by depositing a non-preformed film onto the pressure-sensitive adhesive, wherein the printable continuous film is nonblocking and, in combination with the pressure-sensitive adhesive layer, sufficiently self supporting;

a printing indicia disposed directly on a surface of the printable continuous film;

wherein the combined flexible substrate, layer of pressure-sensitive adhesive, and printable continuous film provide a die-cuttable and matrix-strippable construction.

9. A faceless pressure-sensitive adhesive construction comprising:

a flexible substrate having a release surface;

a continuous layer of pressure-sensitive material disposed on the release surface;

a continuous film disposed over a surface of the layer of pressure-sensitive adhesive to provide a printable construction surface and to render the pressure-sensitive adhesive tack free, wherein the continuous film is deposited directly onto the surface of the pressure-sensitive adhesive in the form of a non-preformed film selected from the group of film-forming polymers consisting of polyamide resins, polyester resins, polyurethane resins, polyacrylate resins, vinyl acetate resins, and mixtures thereof;

wherein the combined flexible substrate, layer of pressure-sensitive adhesive, and continuous film provide a die-cuttable and matrix-strippable construction.

10. The pressure-sensitive adhesive construction as recited in claim 9 wherein the non-preformed film is a polyamide resin.

11. The pressure-sensitive adhesive construction as recited in claim 9 wherein the non-preformed film has a hot melt viscosity within a factor of about two times a hot melt viscosity for the pressure-sensitive material.

12. The pressure-sensitive adhesive construction as recited in claim 9 wherein the continuous film provides a nonblocking surface having a minimum blocking temperature of at least 50° C. for a period of 24 hours at a pressure of about 40 kilopascals.

13. The pressure-sensitive adhesive construction as recited in claim 9 wherein the continuous film has a percent elongation in the range of from 50 to 500.

14. The pressure-sensitive adhesive construction as recited in claim 9 wherein the non-preformed film has a coat weight in the range of from 4 to 35 g/m².

15. The pressure-sensitive adhesive construction as recited in claim 14 wherein the pressure-sensitive adhesive has a coat weight in the range of from 5 to 125 g/m².

16. The pressure-sensitive adhesive construction as recited in claim 9 wherein the pressure-sensitive adhesive and continous film are preferentially separable from the flexible substrate.

17. An imprintable faceless pressure-sensitive adhesive construction comprising:

a first flexible substrate having a release surface;

a layer pf pressure-sensitive adhesive disposed on the release surface;

a continuous film disposed on a surface of the pressure-sensitive layer rending the pressure-sensitive adhesive tack free and nonblocking, wherein the continuous film is applied directly onto the surface of the pressure-sensitive adhesive in the form of a non-preformed polyamide resin film having a hot melt viscosity within a factor of about two times a hot melt viscosity of the pressure-sensitive adhesive to facilitate simultaneous application with the pressure-sensitive adhesive; and printing indicia disposed on a surface of the continuous film.

18. The pressure-sensitive adhesive construction as recited in claim 17 wherein the continuous film provides a nonblocking surface having a minimum blocking temperature of at least 50° C. for a period of 24 hours at a pressure of about 40 kilopascals.

19. The pressure-sensitive adhesive construction as recited in claim 18 wherein the continuous film has a percent elongation in the range of from 50 to 500.

20. The pressure-sensitive adhesive construction as recited in claim 18 wherein the continuous film has a tensile strength of at least 200 psi.

21. The pressure-sensitive adhesive construction as recited in claim 17 wherein the continuous film has a coat weight in the range of from 4 to 35 g/m².

22. An imprintable pressure-sensitive adhesive construction comprising:

a flexible substrate having a release surface;

a layer of pressure-sensitive adhesive disposed on the release surface;

a single continuous film disposed on the layer of pressure-sensitive adhesive that is nonblocking and, in combination with the pressure-sensitive adhesive layer, sufficiently self supporting, wherein the continuous film is applied to the layer of pressure-sensitive adhesive in the form of a non-preformed film from a film forming material; and printing indicia disposed onto a surface of the film-forming material;

wherein the layer of film-forming material has a tensile strength in the range of from about 200 to 2,000 psi, and having a percent elongation in the range of from about 50 to 500.

23. An imprintable pressure-sensitive adhesive construction prepared by the process of:

depositing a layer of pressure-sensitive adhesive onto a release surface of a flexible substrate;

depositing, simultaneously with the layer of pressure-sensitive adhesive, a printable continuous film layer onto the layer of pressure-sensitive adhesive, the printable continuous film layer being deposited in the form of a non-preformed film, wherein the printable continuous film is nonblocking and, in combination with the pressure-sensitive adhesive layer, sufficiently self supporting;

wherein the combined flexible substrate, layer of pressure-sensitive adhesive, and printable continuous film provide a die-cuttable and matrix-strippable construction.

24. The pressure-sensitive adhesive construction as recited in claim 23 wherein the non-preformed film has a hot melt viscosity that is within a factor of about two times a hot melt viscosity of the pressure-sensitive adhesive.

25. An imprintable faceless pressure-sensitive adhesive construction prepared by the process of:

depositing a layer of pressure-sensitive adhesive onto a release surface of a first flexible substrate;

depositing a continuous film onto a surface of the pressure-sensitive layer to render the pressure-sensitive adhesive tack free and nonblocking, wherein the continuous film is applied directly onto the surface of the pressure-sensitive adhesive layer in the form of a non-preformed film selected from the group of film-forming polymers consisting of polyamide resins, polyester resins, polyurethane resins, polyacrylate resins, vinyl acetate resins, and mixtures thereof, the non-preformed film having a hot melt viscosity within a factor of about two times a hot melt viscosity of the pressure-sensitive adhesive; and printing an indicia onto a surface of the continuous film; wherein the steps of depositing are conducted simultaneously.

26. An imprintable faceless pressure-sensitive adhesive construction prepared by the process of:

depositing a layer of pressure-sensitive adhesive onto a release surface of a first flexible substrate;

depositing a continuous film onto a surface of the pressure-sensitive layer to render the pressure-sensitive adhesive tack free and nonblocking, wherein the continuous film is applied directly onto the surface of the pressure-sensitive adhesive layer in the form of a non-preformed film selected from the group of film-forming polymers consisting of polyamide resins, polyester resins, polyurethane resins, polyacrylate resins, vinyl acetate resins, and mixtures thereof, the non-preformed film having a hot melt viscosity within a factor of about two times a hot melt viscosity of the pressure-sensitive adhesive; and printing an indicia onto a surface of the continuous film; wherein the non-preformed film is a polyamide resin.

* * * * *